United States Patent [19]

Koch et al.

[11] Patent Number: 4,772,676

[45] Date of Patent: Sep. 20, 1988

[54] AMBIENT TEMPERATURE QUASI-POLAR CATALYSTS OF AMINE CURABLE POLYMERS

[75] Inventors: Russell W. Koch, Hartville, Ohio; Thomas F. Donatelli, Mt. Lebanon, Pa.

[73] Assignee: The Firestone Tire & Rubber Company, Akron, Ohio

[21] Appl. No.: 122,729

[22] Filed: Nov. 18, 1987

[51] Int. Cl.$^4$ ............................................. C08G 18/06
[52] U.S. Cl. ........................................ 528/49; 528/52; 528/59; 528/73
[58] Field of Search .................. 528/49, 52, 59, 73; 525/453

[56] References Cited

U.S. PATENT DOCUMENTS

| | | | |
|---|---|---|---|
| 3,888,831 | 6/1975 | Kogon | 252/182 |
| 4,046,743 | 9/1977 | Schonfeld | 260/77.5 |
| 4,463,155 | 7/1984 | Kibler | 528/61 |
| 4,517,331 | 5/1985 | Parker | 524/451 |

*Primary Examiner*—Maurice J. Welsh
*Attorney, Agent, or Firm*—Daniel N. Hall

[57] ABSTRACT

Alcohol catalysts are utilized to effect ambient temperature cure of urethane prepolymers or polymers with a methylenedianiline (MDA) salt complex. The alcohol catalysts are generally quasi polar such as a polyester polyol, a polyether polyol, an aliphatic polyol, or an aliphatic or an aryloxypoly(oxyalkylene) alcohol.

18 Claims, No Drawings

4,772,676

AMBIENT TEMPERATURE QUASI-POLAR CATALYSTS OF AMINE CURABLE POLYMERS

FIELD OF THE INVENTION

The present invention relates to the utilization of various quasi polar alcohols which effect cure at ambient temperatures of urethane prepolymers or polymers with salt complexes of methylenedianiline (MDA).

BACKGROUND OF THE INVENTION

Heretofore, salt complexes of methylenedianiline (MDA) have been utilized to cure various urethane prepolymers generally at elevated temperatures in the presence of various compounds or catalysts. For example, U.S. Pat. No. 3,888,831 to Kogon relates to curing of amine-curable polymers or prepolymers utilizing a salt complex of methylenedianiline in association with a polar compound such as an ester, a ketone, an ether, a halogenated hydrocarbon, a tertiary amine, a sulfone, a sulfoxide, or a sulfide.

U.S. Pat. No. 4,046,743 to Schonfeld relates to the use of MDA as a curing agent of amine curable polymers or prepolymers in the presence of a high dielectric constant catalytic compound such as tributyl phosphate.

U.S. Pat. No. 4,517,331 to Parker relates to a prepolymer of a polypropylene ether glycol, a sufficient amount of an organic polyisocyanate and a complex of MDA in the presence of a pseudocrown ether containing various radicals.

U.S. Pat. No. 4,463,155 to Kibler relates to a polyether polyurethane elastomer prepared from a polyether prepolymer, a polyether diol such as polytetrahydrofuran diol, and a curing agent such as an amine curing agent or a diol curing agent.

SUMMARY OF THE INVENTION

It is therefore an aspect of the present invention to provide an alcohol type catalyst for curing urethane polymers or prepolymers with salt complexes of MDA at ambient temperatures. The alcohol catalyst also imparts a plasticizing effect to the cured polymer. Another aspect of the present invention is that the urethane cure system is generally solvent free.

These and other aspects of the present invention will be better understood by reference to the following specification.

DETAILED DESCRIPTION OF THE INVENTION

According to the present invention, quasi polar alcohol catalysts effect an ambient temperature cure of urethane polymers or prepolymers with salt complexes of MDA. Various urethane polymers or prepolymers can be utilized and such are known to the art and to the literature. Generally, the urethane prepolymers or polymers are a polyether polyol or a polyester polyol. The polyether polyols utilized are a poly(oxyalkylene) polyol. These polyols are made from polyhydric alcohol initiators having from 1 to about 6 carbon atoms or water with various oxiranes containing 3 or more carbon atoms. The end result is a hydroxyl terminated poly(oxyalkylene) polyol. The polyhydric alcohol contains from 2 to about 6 hydroxyl groups with 2 or 3 hydroxyl groups (that is a diol or a triol) being preferred. Suitable polyhydric alcohol initiators include ethylene glycol, propylene glycol glycerin, pentaerythritol, arabitol, sorbitol, and the like. The poly(oxyalkylene) groups are generally derived from oxiranes or from alkyl substituted oxiranes and contain a total of 3 to about 6 carbon atoms therein such as propylene oxide with 3 carbon atoms being desired, that is poly(oxypropylene) diol or triol. The preferred oxirane compound is tetrahydrofuran (THF). This polymerizes to poly(tetrahydrofuran) diol or polyol compounds. Specific examples of such compounds are commercially available from the Quaker Oats Company as Polymeg 650, Polymeg 1,000, Polymeg 2,000, and Polymeg 5,200.

The above polyether can also contain ethylene oxide end blocks thereon. In other words, ethylene oxide is graphed onto the ends of the polyether polyol. Addition of excessive ethylene oxide is avoided since ethylene oxide is water soluble and a hydrophilic segment in the final product is generally not desired. Excessive ethylene oxide furthermore causes a change of various properties such as increased sensitivity to water and increased glass transition temperatures. Too little ethylene oxide tends to have reduced reactivity with the salt complex of MDA. Generally, a suitable number of ethylene oxide units in the end block is from about 1 to about 20, and desirably from about 4 to about 10 units. Thus, of the large number of individual intermediate molecules prepared, the ethylene oxide end caps, on the average, will have at least 1 to a maximum of approximately 20 repeating ethylene oxide units therein.

The amount of ethylene oxide contained therein is generally from 2 percent to about 60 percent by weight, desirably from about 8 percent to about 25 percent, and preferably from about 12 percent to about 20 percent by weight based upon the total weight of the end capped poly(oxyalkylene) polyol. Examples of specific ethylene oxide end capped polyethers include the various Voranol compounds produced by Dow Chemical, such as for example Voranol 4702, Voranol 4815, Voranol 5287, and the like. According to the present invention, ethylene oxide end capped polyether triols can also be used. The ethylene oxide containing polyether intermeidates of the present invention generally have an equivalent weight of from about 300 to about 5,000 and desirably from about 650 to about 2,000.

Another type of polyol intermediate which can be utilized in the present invention are the various polyester polyols. These polyols are well known to the art and to the literature. The polyester polyols are generally made by the reaction of a dicarboxylic acid having from 2 to 12 carbon atoms with a diol having 2 to 12 carbon atoms. Examples of suitable acids include adipic acid, sebacic acid, suberic acid, terephthalic acid, and the like. Various glycols such as ethylene glycol, 1,4-butanediol and neopentylglycol can be utilized in the preparation of polyesters. Examples of specific polyester polyols include poly(1,4-butyleneadipate), poly(ethyleneadipate), and poly(1,4-butyleneterephthalate). The equivalent weight of the various polyester polyols is generally from about 300 to about 5,000 with from about 300 to about 2,000 being preferred.

The polyol intermediates of the present invention are reacted with a polyisocyanate to produce the urethane prepolymers of the present invention. The polyisocyanate generally has the formula $R(NCO)_n$ where R is an aliphatic, preferably an alkyl having from 2 to 20 carbon atoms, and desirably from 4 to 8 carbon atoms, an aromatic or an alkyl substituted aromatic having from 6 to 20 carbon atoms, and preferably from 6 to 14 carbon atoms, and wherein n is 2 or 3, preferably 3. Generally, aromatic or alkyl substituted aromatic diisocyanates are preferred. Examples of specific diisocyanate include, tolylene-2,4-diisocyanate, tolylene-2,6-diisocyanate, naphthalene-1,5-diisocyanate, diphenyl-4,4'-diisocyanate, benzophenone-4,4'-diisocyanate, diphenylether or diphenylsulphide-4,4'-diisocyanate and their derivatives substituted with alkyl, alkoxy, halogen or nitro groups, e.g. 3,3'-dimethyldiphenyl-4,4'-diisocyanate or 3,3'-dichlorodiphenylmethane diisocyanate, their mixtures and the like. Toluene diisocyanate (TDI) and methylene diphenyl diisocyanate (MDI) are highly preferred. The equivalent ratio or amount of the polyisocyanate to the intermediate is generally an excess in accordance with conventional practice.

As noted, the curing agent is a complex of 4,4'-methylenedianiline (MDA) and a salt as set forth in U.S. Pat. No. 3,755,261 to VanGulick, which is hereby fully incorporated by reference. A preferred salt utilized with the 4,4'-methylenedianiline compound is sodium chloride or lithium chloride. The equivalent weight ratio of the amine curing agent ($NH_2$), that is the salt complex of MDA to the urethane prepolymer (NCO) generally ranges from about 0.85 to about 1.20 with from about 0.95 to 1.05 equivalents being preferred. Often to facilitate processing, the amine curing agent, and especially the complex of 4,4'-methylenedianiline and a salt is utilized with a plasticizer such as dioctylphthalate on a 50 percent weight basis, or Flexol 4-G0, tetraethylene glycol bis-(2-ethyl hexanoate) manufactured by Union Carbide Corporation on a 50 percent weight basis. The amount of plasticizer can be from about 20 percent by weight to about 60 percent by weight based upon the weight of the amine curing agent and said plasticizer.

The MDA amine curing agent complex is blended with the polymer or prepolymer which is usually a liquid in various mixers such as dough mixers, high speed impellers, paddle-type mixers, and the like. Small batches can be mixed by stirring with a spatula.

According to the present invention, the various alcohol catalysts are generally quasi polar. By the term "quasi polar," it is meant that the alcohol catalyst generally has sufficient polarity or activity to break down the salt complex of MDA and to activate the same at ambient temperatures, defined hereinbelow. Inasmuch as the alcohol catalyst does not enter into the reaction, it is a true catalyst. The equivalent amount of the quasi polar alcohol catalyst utilized is from about 0.5 to about 2.0 equivalents and preferably from about 0.7 to about 1.5 weight equivalents. Thus, significant amounts of the alcohol catalyst are generally utilized in accordance with the concepts of the present invention. Such catalyst is in addition to the equivalent ratio of the curing agent. Thus, the total equivalent amount or equivalent ratio of the alcohol catalyst and the MDA salt complex curing agent to the NCO groups of the prepolymer or polymer is from about 1.35 to about 3.15 and preferably from about 1.65 to about 2.55. Naturally, such total equivalent amount or ratio is well in excess of generally any type of urethane curing utilized in that the equivalent ratio of any conventional urethane curing agent is usually about one equivalent for each equivalent NCO group.

Generally, any quasi polar alcohol compound such as a polyhydric alcohol or monohydroxy alcohol can be utilized as a catalyst in accordance with the present invention which tends to be effective, that is breaks down the MDA salt complex such that it can react with the urethane prepolymer or polymer and cure the same at ambient temperatures such as those set forth hereinbelow. Generally, the various aliphatic polyols and desirably the alkyl polyols can be utilized having from about 2 to about 12 carbon atoms, and preferably from about 2 to about 6 carbon atoms. Included within the aliphatic or alkyl polyols are the various cyclic compounds thereof. Examples of specific aliphatic or cycloaliphatic polyols are 1,4-butane diol, ethylene glycol, 1,6-hexane diol, 2,3-butane diol, 1,4-cyclohexane diol, 1,3-cyclopentane diol, and 2,2-dimethyl-1,3-cyclopentane diol.

The polyether polyols include another class of quasi polar alcohol catalysts which can be utilized in the present invention. These polyols have been described hereinabove and hence will not be repeated but rather are fully incorporated by reference. Examples of specific polyether polyols are the various Polymeg compounds manufactured by the Quaker Oats Company and are essentially polytetrahydrofuran diols of different molecular weights.

The polyester polyols can also be utilized as alcohol catalysts of the present invention. These compounds are generally characterized by containing hydroxyl terminated or hydroxyl groups within the polyester. Such polyols have been described hereinabove and hence are fully incorporated by reference. Examples of specific polyester polyols include poly(1,4-butyleneadipate) and poly(ethyleneadipate).

Other classes of quasi polar alcohol catalyst include the various aliphatic alcohols, and the various aryloxypoly(oxyalkylene) alcohols. The aliphatic alcohol generally has from 1 to 12 carbon atoms and can be an alkyl having from 1 to about 12 carbon atoms, or a cycloalkyl alcohol having from 4 to about 12 carbon atoms. The alkylene repeat group of the aryloxypoly(oxyalkylene) alcohol, a preferred catalyst, generally has from 2 to 6 carbon atoms with ethylene being preferred. The alcohol end group can have from 2 to about 6 carbon atoms with an ethanol group, that is 2 carbon atoms being preferred. The aryl group is an aryl or an alkyl substituted aryl having from 6 to 12 carbon atoms. A specific preferred example is nonylphenoxypoly(oxyethylene) ethanol. Such compounds are generally available under the Igepal mark and are manufactured by GAF Corporation. The equivalent weight of the aryloxypoly(oxyalkylene) alcohols is from about 300 to about 600 with from about 400 to about 450 being preferred.

It is to be understood that the alcohol catalysts of the present invention, while at times they can be the same as the various urethane intermediates, are not added prior to the prepolymer or polymer formation but only after all of the intermediates have been reacted. That is, all the intermediates are reacted or capped with an isocyanate group so that the prepolymer can be cured with the salt complex of MDA. Generally, the alcohol catalyst is added with the MDA to the urethane polymer or prepolymer. That is, they are generally simultaneously added although the alcohol catalyst can be added prior to the addition of the MDA salt complex curing agent. The aliphatic polyols are preferred and especially 1,4-butanediol as are the aryloxypoly(oxyalkylene) alcohols such as nonylphenoxypoly(oxyethylene) ethanol. As noted above, the alcohols are a true catalyst since they effect cure at ambient temperature and do not enter into the reaction.

The various alcohol catalysts of the present invention result in an ambient temperature cure with the amine curable polymers or prepolymers and the MDA curing agent. By the "ambient temperature cure," it is meant a cure of from about 10° C. to about 50° C. and preferably from about 15° C. to about 35° C. Naturally, the rate of cure will vary upon the amount of alcohol catalyst utilized.

The ambient temperature amine curable polymer or prepolymer compositions of the present invention can be utilized wherever an ambient temperature cure is desired. The compositions of the present invention can often be utilized where an adhesive and/or rubbery filler is desired. For example, one suitable application is in the repair of tires as for example, filling gouges or hollows of injured tires, i.e., off-the-road tires and the like including those having a crack or cut therein. The repair of such tires can be in assooiation with an interior patch. Moreover, the compositions of the present invention can also be utilized in association with an internal grid located on the interior portion of a tire and having a patch thereover. Regardless of the type of repair, the compositions of the present invention adhere to form a plug, fill an interior cavity with regard to a crack cut, etc., and hence fill the gouge, opening or hollow.

When the mixture compositions of the present invention is applied to an elastomer base or substrate, such base or substrate can be made of various rubber compounds known to the art and to the literature. One such class of compounds are the various conjugated dienes having from 4 to 12 carbon atoms. Specific examples of diene monomers include butadiene, isoprene, pentadiene, hexadiene, heptadiene, octadiene, 2,3-dimethyl-1,3-butadiene, 2-methyl-1,3-pentadiene, and the like. Preferred conjugated elastomers are made from monomers of butadiene and/or isoprene. Moreover, natural rubber can be utilized. By the term "natural rubber," it is meant the elastomeric substance obtained from various trees and plants which generally grow in the tropics or desert portions of the world. Such material contains a very high content (in excess of 90 percent and often in excess of 95 percent) of cis-1,4-polyisoprene. Also included within the class of conjugated dienes and/or natural rubber are the various copolymers and interpolymers thereof (e.g., polybutadiene-isoprene), including the various diblock copolymers and interpolymers thereof (e.g., polystyrene-butadiene-styrene), and the like.

Another class of elastomers include the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alpha-methylstyrene, 4,t-butylstyrene, vinyl toluene, divinyl toluene, divinyl benzene, isopropenyl benzene, diisopropenyl benzene, and the like. Examples of specific copolymers thus include polystyrene-butadiene (SBR), poly-alpha-methylstyrene-butadiene, and poly-4-t-butylstyrene-butadiene. A preferred copolymer is polystyrene-butadiene.

Yet another group of elastomer compounds include copolymers and desirably terpolymers made from ethylene and/or propylene monomers which are reacted with a small amount of diene having from 4 to 12 carbon atoms, commonly referred to in the art as an EPDM type polymer. Any conventional diene monomer utilized in the formation of the EPDM rubber may be utilized and specific examples include butadiene, dicyclopentadiene, ethylene norborene, and 1,4-hexadiene.

Another group of rubber compounds are the so-called butyl rubbers which are actually copolymers of isobutylene and a small amount of isoprene.

Neoprene, that is polychloroprene (2-chloro-1,3-butadiene), can also be utilized. Still another class of an elastomer rubber are the nitrile rubbers, that is copolymers made from dienes as set forth above having from 4 to 12 carbon atoms with acrylonitrile monomers. Usually the ratio of the two monomers in nitrile rubber is similar to the ratio of butadiene to styrene in styrene-butadiene rubber.

Good adhesion or bond strength between the alcohol catalyzed MDA salt complex cured urethane prepolymers or polymers of the present invention with the elastomer or rubber substrate is often obtained when the substrate is treated with a halogen containing oxidant, see Example III. Such compounds include the various N-halosulfonamides, the various N-halohydantoins, the various N-haloamides, and the various N-haloimides. Examples of various desirable N-halosulfonamides include N,N,N',N'-tetrachloro-oxybis(benzenesulfonamide); N,N,N',N'-tetrachloro-4,4-biphenyl disulfonamide; N,N,N',N'-tetrachloro-1,3-benzene disulfonamide; and N,N,N',N'-tetrabromo-oxybis(benzenesulfonamide). Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloimides include N-bromoacetamide and tetrachloroglycoluril. Examples of N-haloimides include N-bromosuccinimide and the various mono-, di- and tri-chlorocyanuric acids. A preferred adhesive treating compound of the present invention is the various mono-, di-, or tri-chloroisocyanuric acids, or combinations thereof. Trichloroisocyanuric acid is especially preferred.

The treating agents can be applied to the rubber substrate in any conventional manner as by spraying, brushing, dipping, or the like. The alcohol catalysts is then added to the mixture of the urethane prepolymer and the salt complex of MDA, the various components are then mixed, and immediately applied to the rubber substrate. As noted above, cure takes place at ambient temperature.

The invention will be better understood by reference to the following examples.

EXAMPLE I

A polyurethane of the following composition was prepared:

| | GMS | EQUIVALENT WEIGHT | NCO/NH$_2$ |
|---|---|---|---|
| Adiprene L-42 (2.88% NCO) (NCO) | 50 | 0.03428 | 1.20 |
| Caytur 21 (MDA.NaCl Complex) (NH$_2$) | 6.2 | 0.02848 | |

These components were weighed into a glass jar. The 1,4butanediol or Polymeg 650 (a poly TMF-diol of 500–700 molecular weight) was added and mixed at the following weights. The set-up time to a tack free state at room temperature was measured.

| GMS | MOL. WT. | EQUIV. | SET UP TIME TO TACK-FREE STATE | SHORE A HARDNESS (RT) AFTER 24 HOURS |
|---|---|---|---|---|
| Polymeg 650(Poly THF Diol)(OH #180.3) | | | | |
| 14.05 | 311.15 | 0.04515 | 2 hrs. | 68 |
| 1,4-Butanediol | | | | |
| 2.03 | 90.12 | 0.04505 | 15 min. | 72 |

Thus, it is seen that both the above quasi polar alcohol type catalysts resulted in a cure of the polyurethane although the butanediol had a faster reaction time.

EXAMPLE II

A polyurethane of the following composition was prepared.

| | GMS | EQUIV. | | NCO/NH$_2$ |
|---|---|---|---|---|
| Adiprene L-42 (2.88% NCO) | 150 | 0.10286 | | |
| Adiprene L-367 (6.50% NCO) | 150 | 0.23214 | 0.3350 | 1.02 |
| Flexol 4GO (Plasticizer) | 30 | | | |
| Caytur 21 | 71.9 | 0.3285 | | |

The components were weighed into a glass jar. The 1,4- or 2,3-butanediol was added and mixed at the following weight. The set-up time was then mounted at room temperature.

| | GMS | MOL. WT. | EQUIV. | (MIN) NON-POURABLE | (MIN) NON-SPREADABLE |
|---|---|---|---|---|---|
| 1,4-Butanediol | 11.0 | 90.12 | 0.2441 | 5 | 10 |
| 2,3-Butanediol | 11.00 | 90.12 | 0.2441 | 15 | 25 |

These results show by change of structure of the catalyst measurable changes in the cure rate can be observed.

EXAMPLE III

A polyurethane of the following composition was prepared.

| | GMS | EQUIV. | NCO/NH$_2$ |
|---|---|---|---|
| Adiprene L-42 (2.88% NCO) | 60 | 0.0414 | |
| Flexol 4GO (plasticizer) | 60 | | |
| Caytur 21 (MDA N$_a$Cl Complex) | 8.92 | 0.04096 | 1.004 |
| 2,3-Butanediol | 1.5 | 0.03329 | |

The material has mixed and peel adhesion pads were prepared out of several different materials.

These results were compared to a control containing acetone as a catalyst. As apparent from the "RT peel adhesion results" Table, the compounds of the present invention gave equivalent or better adhesion results.

The control formulation was as follows:

| | GMS | EQUIV. | NCO/NH$_2$ |
|---|---|---|---|
| Adiprene L-42 (2.88% NCO) | 30 | 0.02057 | |
| Adiprene L-367 (6.50% NCO) | 30 | 0.04653 | 0.06700 eq. 1.00 |
| Flexol 4GO (plasticizer) | 6 | | |
| Acetone | 6 | | |
| Caytur 21 (MDA NaCl Complex) | 14.66 | 0.06700 | |

| RT PEAL ADHESION RESULTS | | |
|---|---|---|
| | Control (Pli) | 2,3-Butanediol Mat'l |
| Rubber Stock A | 31 | 33 |
| Rubber Stock 8 | 27 | 36 |
| Repair Patch Stock | 40 | 60 |
| Nylon Cord Stock | 29 | 47 |

(1) A is a 80/20 Natural Rubber/SBR stock
(2) B is a 100% Natural Rubber Stock
(3) Repair patch cushion compound proprietary
(4) Nylon cords exposed and calendared between a 100% Natural Rubber Stock.

As apparent from the above data, the butane diol catalyst of the present invention catalyzed the reaction and resulted in good peeled adhesion properties, in fact generally much better than that of the control. Moreover, inasmuch as the use of acetone was eliminated, there are no associated volatility problems or potential flammability problems.

EXAMPLE IV

| | GMS | EQUIV. | | NCO/NH$_2$ |
|---|---|---|---|---|
| Adiprene L-42 (2.88% NCO) | 25 | 0.01714 | | |
| Adiprene L-367 (6.50% NCO) | 25 | 0.03869 | 0.0583 | 1.02 |
| Acetone | 5 | | | |
| Flexol 4GO (Plasticizer) | 5 | | | |
| Caytur 21 | 12 | 0.05475 | | |

The materials were mixed and allowed to cure overnight.

EXPERIMENT—10% GAF CO 430

| | GMS | EQUIV. | | NCO/NH$_2$ |
|---|---|---|---|---|
| Adiprene L-42 (2.88% NCO) | 25 | 0.01714 | | |
| Adiprene L-367 (6.50% NCO) | 25 | 0.03869 | 0.05583 | 1.02 |
| Flexol 4GO (Plasticizer) | 5 | | | |
| GAF CO-430 (nonylphenoxypoly (oxyethylene) ethanol | 7.4 | | | |
| Caytur 21 | 12.0 | 0.05475 | | |

The materials were mixed and allowed to cure overnight.

| RESULTS | SHORE A HARDNESS |
|---|---|
| Control | 86 |
| 10% CO 430 | 86 |

When various other levels of CO 430 were used, the following results were obtained.

| FORMULATION | SHORE A HARDNESS |
|---|---|
| 15% CO 430 | 84[1] |
| 20% CO 430 | 78[1] |
| 25% CO 430 | 70[2] |
| 30% CO 430 | 66[2] 75[1] |
| 35% CO 430 | 62[2] 65[1] |
| 40% CO 430 | 55[2] 58[1] |
| 60% CO 430 | 31[1] |

[1] After 24 hours, cure at room temperature
[2] After 3 hours, cure at room temperature From the above data, it is apparent that the elimination of a flammable volatile solvent such as acetone and the utilization of an alcohol catalyst of the present invention resulted in a cure at ambient temperature with good hardness. As larger amounts of the catalyst was utilized, a plasticizing affect was noted.

While in accordance with the patent statutes, the best mode and preferred embodiment has been set forth, the scope of the invention is not limited thereto, but rather by the scope of the attached claims.

What is claimed is:

1. An ambient temperature curable urethane prepolymer or polymer composition, comprising:
the urethane prepolymer or polymer, a salt complex of methylenedianiline, and an effective amount of a quasi polar catalyst so that said urethane prepolymer or polymer is curable by said salt complex of methylenedianiline at an ambient temperature, said ambient curing temperature being from about 10° C. to about 50° C., and said quasi polar catalyst being a polyether polyol having an equivalent weight from about 300 to about 5,000, a polyester polyol having an equivalent weight from about 300 to about 5,000, an aliphatic polyol having from 2 to 12 carbon atoms, an aliphatic alcohol having from 1 to 12 carbon atoms, or an aryloxypoly(oxyalkylene) alcohol having an equivalent weight of from about 300 to about 600, or combinations thereof.

2. An ambient temperature curable urethane prepolymer or polymer composition according to claim 1, wherein the equivalent amount of said catalyst is from about 0.5 to about 2.0 equivalents for every equivalent of NCO in said urethane prepolymer or polymer, wherein said polyether polyol catalyst is a poly(oxyalkylene) diol or triol wherein said alkylene group has from 2 to 6 carbon atoms, wherein said polyester polyol catalyst is made from a dicarboxylic acid having a total of from 2 to 14 carbon atoms and a diol having from 2 to 12 carbon atoms, wherein said aliphatic polyol is an alkyl polyol having from 2 to about 12 carbon atoms, wherein said aliphatic alcohol is an alkyl alcohol having from 1 to 12 carbon atoms or a cycloalkyl alcohol having from 4 to 12 carbon atoms, and wherein said aryloxypoly(oxyalkylene) alcohol has an alkylene group having from 2 to 6 carbon atoms, an alcohol group having from 2 to 6 carbon atoms, and an aryl group or an alkyl substituted aryl group having from 6 to 12 carbon atoms.

3. An ambient temperature curable urethane prepolymer or polymer composition according to claim 2, wherein said urethane prepolymer or polymer is made from an intermediate and a polyisocyanate, wherein said polyisocyanate has the formula $R(NCO)_n$ wherein R is an aliphatic group having from 2 to 20 carbon atoms, or an aromatic or an alkyl substituted aromatic having from 6 to 20 carbon atoms, and wherein n is 2 or 3.

4. An ambient temperature curable urethane prepolymer or polymer composition according to claim 3, wherein said intermediate is a polyether polyol or a polyester polyol, wherein said polyether polyol intermediate has an equivalent weight of from about 300 to about 5,000, and wherein said polyester polyol intermediate has an equivalent weight of from about 300 to about 5,000.

5. An ambient temperature curable urethane prepolymer or polymer composition according to claim 4, wherein the equivalent amount of said quasi polar catalyst is from about 0.7 to about 1.5 equivalents for each equivalent of NCO in said urethane prepolymer or polymer, wherein said quasi polar catalyst is said poly(oxyalkylene) diol or triol having an equivalent weight of from about 650 to about 2,000, said alkyl polyol having from 2 to 6 carbon atoms, said alkyl alcohol, or said aryloxypoly(oxyalkylene) alcohol having an equivalent weight of from about 400 to about 450, wherein said urethane intermediate is a poly(oxyalkylene) polyol having an equivalent weight of from about 650 to about 2,000 and wherein said alkylene group has a total of 2 to 6 carbon atoms, wherein said "n" of said polyisocyanate is 2, wherein said polyisocyanate is said aromatic or said alkyl substituted aromatic diisocyanate having from 6 to 14 carbon atoms, and wherein the equivalent amount of said MDA salt complex curing agent to said diisocyanate is from about 0.85 to about 1.20 equivalents for each equivalent of said NCO in said urethane polymer or prepolymer.

6. An ambient temperature curable urethane prepolymer or polymer composition according to claim 5, wherein said cure temperature is from about 15° C. to about 35° C., wherein said salt complex of MDA is sodium chloride.

7. An ambient temperature curable urethane prepolymer or polymer composition according to claim 6, wherein said urethane polymer or prepolymer intermediate is poly(tetramethylene) diol, wherein said diisocyanate is toluene diisocyanate or methylenediphenyl diisocyanate, and wherein said quasi polar catalyst is 1,4-butane diol, or phenoxypoly(oxyethylene) ethanol.

8. An ambient temperature curable urethane prepolymer or polymer composition according to claim 7, wherein the equivalent amount of said curing agent is from about 0.95 to about 1.05 equivalents for every equivalent of NCO in said urethane polymer or prepolymer.

9. An ambient temperature cured amine curable urethane polymer or prepolymer, comprising:
the amine curable urethane polymer or prepolymer, said amine curable urethane polymer or prepolymer cured with a methylenedianiline salt complex in the presence of an ambient temperature curable alcohol catalyst.

10. An ambient temperature cured urethane amine curable polymer or prepolymer according to claim 9, wherein the equivalent amount of said alcohol catalyst is from about 0.5 to about 2.0 for every equivalent of NCO in said urethane polymer or prepolymer.

11. An ambient temperature cured urethane amine curable polymer or prepolymer according to claim 10, wherein the equivalent amount of said curing agent is from about 0.85 to about 1.20 for every equivalent of said NCO of said amine curable urethane polymer or prepolymer, wherein said urethane prepolymer or polymer is made from an intermediate and a polyisocyanate, wherein said polyisocyanate has the formula R(NCO)$_n$ wherein R is an aliphatic group having from 2 to 20 carbon atoms, or an aromatic or an alkyl substituted aromatic having from 6 to 20 carbon atoms, and wherein n is 2 or 3.

12. An ambient temperature cured amine curable urethane polymer or prepolymer according to claim 11, wherein said alcohol catalyst is a polyether polyol having an equivalent weight from about 300 to about 5,000, a polyester polyol having an equivalent weight from about 300 to about 5,000, an aliphatic polyol having from 2 to 12 carbon atoms, an aliphatic alcohol having from 1 to 12 carbon atoms, an aryloxypoly(oxyalkylene) alcohol having an equivalent weight of from about 300 to about 600, or combinations thereof, and wherein said polyol intermediate is a poly(oxyalkylene) polyol having an equivalent weight of from about 300 to about 5,000 wherein said alkylene group contains from 2 to 6 carbon atoms, or a polyester polyol made from a dicarboxylic acid having from 2 to 14 carbon atoms with a diol having from 2 to 12 carbon atoms.

13. An ambient temperature cured amine curable urethane polymer or prepolymer according to claim 12, wherein said complex of said methylenedianiline is sodium chloride or lithium chloride, and wherein said ambient temperature cure is from about 10° C. to about 50° C.

14. An ambient temperature cured amine curable urethane polymer or prepolymer according to claim 13, wherein the equivalent amount of said alcohol catalyst is from about 0.7 to about 1.5 for every equivalent of said NCO of said urethane polymer or prepolymer, wherein the equivalent amount of said MDA salt complex curing agent is from about 0.95 to about 1.05 for every equivalent NCO of said urethane polymer or prepolymer, and wherein said alcohol catalyst is said aliphatic polyol wherein said aliphatic polyol is an alkyl polyol, said polyether polyol having a molecular weight of from about 650 to about 2,000 and is a poly(oxyalkylene) polyol wherein said alkylene group contains from 2 to 6 carbon atoms and wherein said polyol is a diol or a triol, said alkyl alcohol having from 1 to 12 carbon atoms, or said aryloxypoly(oxyalkylene) alcohol. complex of said methylenedianiline is sodium chloride or lithium chloride, and wherein said ambient temperature cure is from about 10° C. to about 50° C.

15. An ambient temperature cured amine curable urethane polymer or prepolymer according to claim 14, wherein said alkyl polyol catalysts has from 2 to 6 carbon atoms, wherein said aryloxypoly(oxyalkylene) alcohol catalysts has an equivalent weight of from about 400 to about 450 and an aryl group or an alkyl substituted aryl group having a total of from 6 to 12 carbon atoms, an alkylene group having from 2 to 6 carbon atoms, and an alcohol group having from 2 to 6 carbon atoms, and wherein said polyisocyanate is an aromatic diisocyanate or an alkyl substituted diisocyanate having from 6 to 14 carbon atoms.

16. An ambient temperature cured amine curable urethane polymer or prepolymer according to claim 15, wherein said ambient temperature cure is from about 15° C. to about 35° C., and wherein said urethane intermediate is poly(tetramethylene) diol.

17. An ambient temperature cured amine curable urethane polymer or prepolymer according to claim 14, wherein said aromatic diisocyanate is toluene diisocyanate or methylenediphenyl diisocyanate, wherein said alcohol catalyst is 1,4-butane diol or phenoxypoly(oxyethylene) ethanol.

18. An ambient temperature cured amine curable urethane polymer or prepolymer according to claim 16, wherein said aromatic diisocyanate is toluene diisocyanate or methylenediphenyl diisocyanate, wherein said alcohol catalyst is 1,4-butane diol or phenoxypoly(oxyethylene) ethanol.

* * * * *

UNITED STATES PATENT AND TRADEMARK OFFICE
CERTIFICATE OF CORRECTION

PATENT NO. : 4,772,676
DATED : SEPTEMBER 20, 1988
INVENTOR(S) : RUSSELL W. KOCH AND THOMAS F. DONATELLI

It is certified that error appears in the above-identified patent and that said Letters Patent are hereby corrected as shown below:

Column 7, line 62 - "has" should be "was"

Column 8, line 17 - "Rubber Stock 8" should be "Rubber Stock B"

Signed and Sealed this

Thirty-first Day of January, 1989

*Attest:*

DONALD J. QUIGG

*Attesting Officer*  *Commissioner of Patents and Trademarks*